United States Patent
Chan et al.

(10) Patent No.: US 10,273,734 B2
(45) Date of Patent: Apr. 30, 2019

(54) SMART OPENING SYSTEM AND A METHOD OF OPERATING A SMART OPENING SYSTEM

(71) Applicant: International Business Machines Corporation, Armonk, NY (US)

(72) Inventors: Yuk Lung Chan, Rochester, NY (US); Heidi Lagares-Greenblatt, Jefferson Hills, PA (US); Deepti M. Naphade, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/949,806

(22) Filed: Apr. 10, 2018

(65) Prior Publication Data

US 2018/0230730 A1 Aug. 16, 2018

Related U.S. Application Data

(63) Continuation of application No. 15/191,940, filed on Jun. 24, 2016, now Pat. No. 9,970,227.

(51) Int. Cl.
| | |
|---|---|
| *E05F 15/40* | (2015.01) |
| *B60Q 9/00* | (2006.01) |
| *B60J 5/04* | (2006.01) |
| *E05F 15/611* | (2015.01) |
| *E05F 15/43* | (2015.01) |

(52) U.S. Cl.
CPC .............. *E05F 15/40* (2015.01); *B60J 5/047* (2013.01); *B60Q 9/008* (2013.01); *E05F 15/43* (2015.01); *E05F 15/611* (2015.01); *E05F 2015/432* (2015.01); *E05F 2015/434* (2015.01); *E05Y 2400/44* (2013.01); *E05Y 2400/45* (2013.01); *E05Y 2900/531* (2013.01)

(58) Field of Classification Search
CPC ......... E05F 15/611; E05F 15/40; E05F 15/43; E05F 2015/434; E05F 2015/432; B60J 5/047; B60Q 9/00; B60Q 9/008; E05Y 2900/531; E05Y 2400/44; E05Y 2400/45
USPC .......................................................... 701/49
See application file for complete search history.

(56) References Cited

U.S. PATENT DOCUMENTS

| | | | |
|---|---|---|---|
| 2010/0228448 A1* | 9/2010 | Nakakura | ............... E05F 15/43 701/49 |
| 2017/0291600 A1* | 10/2017 | Styles | ................... B60W 30/00 |
| 2017/0370142 A1 | 12/2017 | Chan et al. | |

FOREIGN PATENT DOCUMENTS

| | | | |
|---|---|---|---|
| CN | 204586758 | * | 8/2015 |
| DE | 19836310 | * | 3/2000 |

OTHER PUBLICATIONS

List of IBM Patents or Patent Applications Treated as Related; (Appendix P), Filed Apr. 10, 2018, 2 pages.

* cited by examiner

*Primary Examiner* — Muhammad Shafi
(74) *Attorney, Agent, or Firm* — Cantor Colburn LLP; Teddi Maranzano

(57) ABSTRACT

A smart opening system is provided. The smart opening system includes a vehicle defining an aperture, a door coupled to the vehicle to assume a first position at which the aperture is closed and multiple second positions at which the aperture is open and to move between the first and second positions, a sensor disposed to sense obstructions surrounding the vehicle and a processing element coupled to the sensor and configured to determine whether any of the obstructions are within a range of motion of the door.

19 Claims, 5 Drawing Sheets

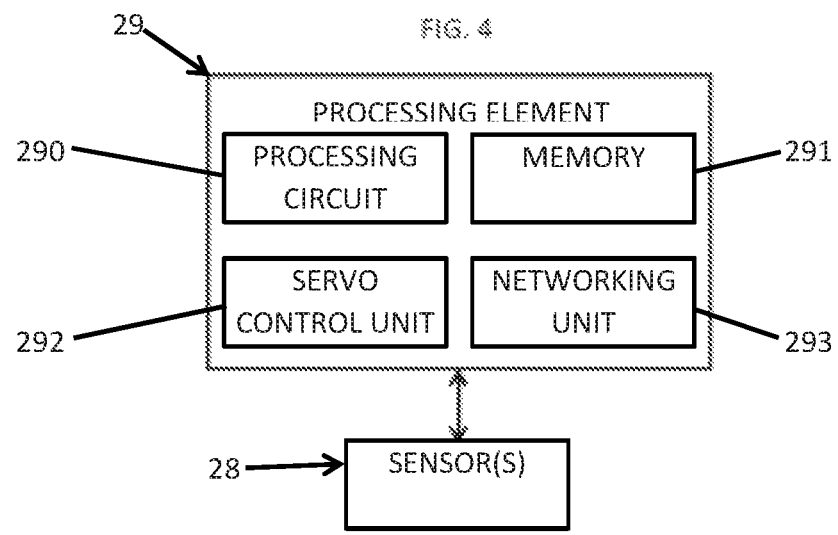
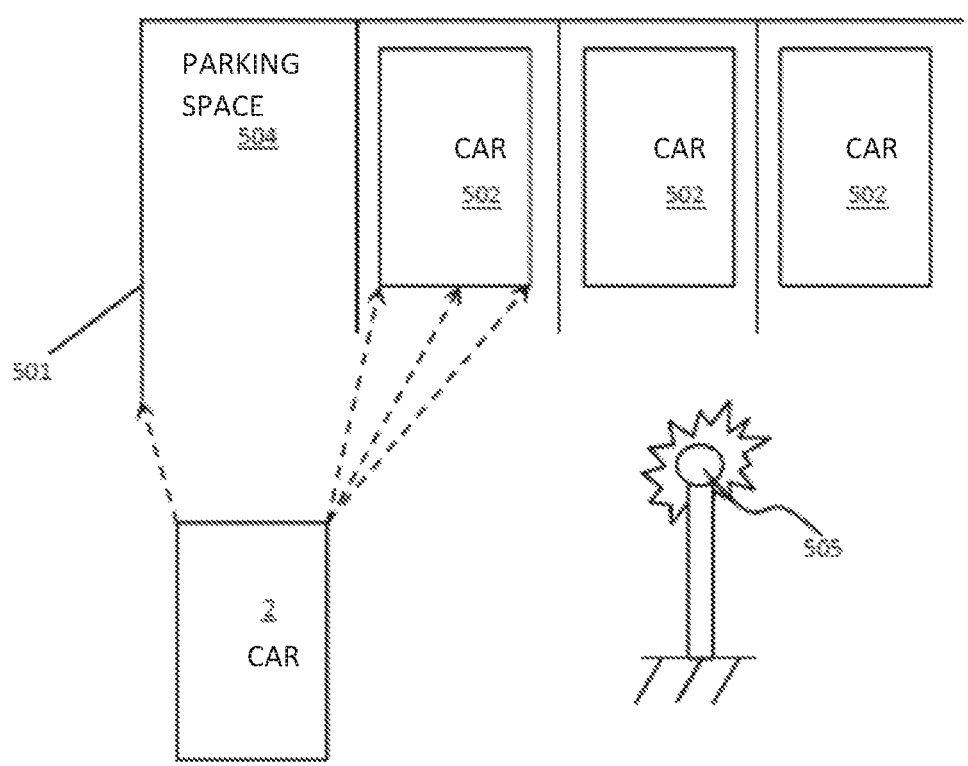

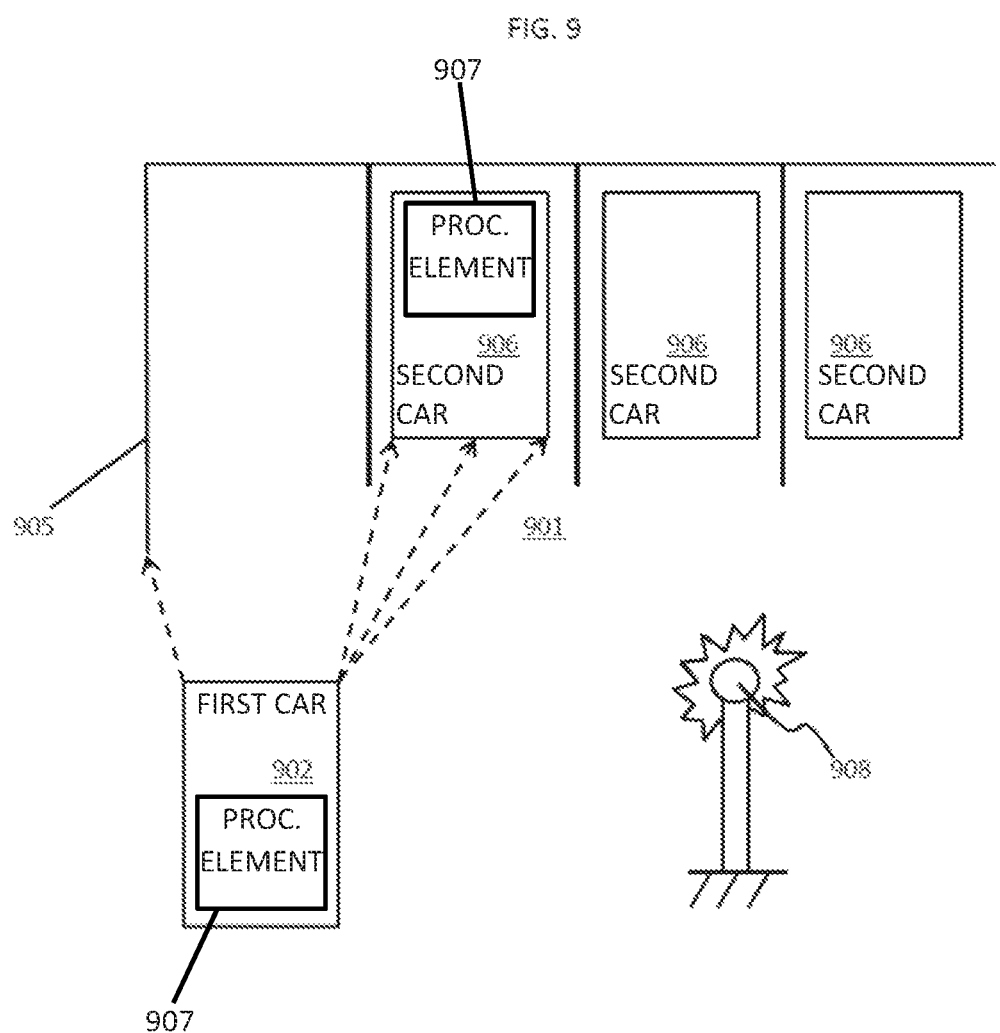

SMART OPENING SYSTEM AND A METHOD OF OPERATING A SMART OPENING SYSTEM

CROSS-REFERENCE TO RELATED APPLICATION

This application claims the benefit of priority of U.S. application Ser. No. 15/191,940, which was filed on Jun. 24, 2016. The entire contents of U.S. application Ser. No. 15/191,940 are incorporated herein by reference.

BACKGROUND

The present invention relates to a smart opening system and a method of operating a smart opening system and, more specifically, to a smart car door opening system and a method of operating a smart car door opening system.

A vehicle door is a type of door, typically hinged, but sometimes attached by other mechanisms such as tracks, in front of an opening which is used for entering and exiting the vehicle. A vehicle door can be opened to provide access to the opening, or closed to secure it. These doors can be opened manually or powered electronically. Powered doors are usually found on minivans, high-end cars, or modified cars.

In the particular case of doors that are hinged to vehicles and opened or closed manually, the doors pivot about the hinge axis between the closed position and any number of opened positions. These opened positions usually include one or two predefined positions (e.g., a fully open position and a half open position) at which the door forms given pivoting angles with the host vehicle. However, a user can open the door to various other positions as well for given needs in given situations. For example, a tall person might want to open a door fully to allow him to enter and exit the vehicle knowing that he will be able to reach the door to close it once inside. By contrast, a petite person might only want to open a door to the half open position because she doesn't need the room to enter and exit and because she wants to be able to reach the door to close it once inside. In either case, a person might only want to open the door slightly and thus shy of even the half open position in order to reach in or out of the vehicle.

SUMMARY

According to an embodiment of the present invention, a smart opening system is provided. The smart opening system includes a vehicle defining an aperture, a door coupled to the vehicle to assume a first position at which the aperture is closed and multiple second positions at which the aperture is open and to move between the first and second positions, a sensor disposed to sense obstructions surrounding the vehicle and a processing element coupled to the sensor and configured to determine whether any of the obstructions are within a range of motion of the door.

According to another embodiment, a method of operating a smart opening system is provided and includes sensing obstructions surrounding a vehicle, determining whether obstructions are within a range of motion of a door of the vehicle, determining whether a parking or a stop-and-open event is currently in effect for the vehicle and issuing a proximity warning to an operator of the vehicle in an event that obstructions are within the range of motion of the door of the vehicle and the parking or the stop-and-open event is currently in effect.

According to another embodiment, a smart opening system is provided and includes a first vehicle defining an aperture, a door coupled to the vehicle to assume a first position at which the aperture is closed and multiple second positions at which the aperture is open and to move between the first and second positions, a sensor disposed to sense obstructions and a second vehicle surrounding the first vehicle and a processing element coupled to the sensor and configured to determine whether any of the obstructions or the second vehicle is within a range of motion of the door and whether any part of the first vehicle is within a range of motion of a door of the second vehicle.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4 is a schematic view of a processing element of the vehicle of FIG. 1;

FIG. 5 is a plan view of a vehicle, such as the vehicle of FIGS. 1-4, pulling into a parking space;

FIG. 9 is a schematic diagram of a smart opening system in accordance with further embodiments.

DETAILED DESCRIPTION

Sometimes it can be hard for a driver to judge if he is parking his car too close to a barrier, a wall or to another car. It can be even more difficult for that driver to judge whether people in his car will have enough space to open his car doors and then get out of the car even if his car is not actually touching an obstruction. Thus, it is often the case that when car doors are opened, they hit obstructions on either side of their host cars. Such impacts can lead to damage to the doors themselves or the object being hit. These problems can be magnified since many parking garages and lots have very narrow parking spaces with small intra-space pitches so that parking and safely getting out of cars is extremely difficult. This is especially true when a person getting out of a car is not careful or sensitive to damage costs (i.e., a child) and is therefore not paying attention to spatial limitations.

Thus, a system is provided for use with vehicles, such as cars or trucks, which will allow vehicles to communicate with their drivers about the spacing of nearby objects, to calculate if the spacing is sufficient to open the vehicle doors wide enough to allow for driver/passenger ingress and egress. The system incorporates sensors and processing elements to dynamically alert drivers to insufficient spatial issues and to limit door opening angles to prevent impacts.

With reference to FIGS. 1-4, a smart opening system 1 is provided for use with a vehicle, such as a car 2 or a truck. While this vehicle can actually have any vehicular configuration, it is to be understood that the following description will relate only to cases in which the vehicle is the car 2 for purposes of clarity and brevity.

Figure 1:
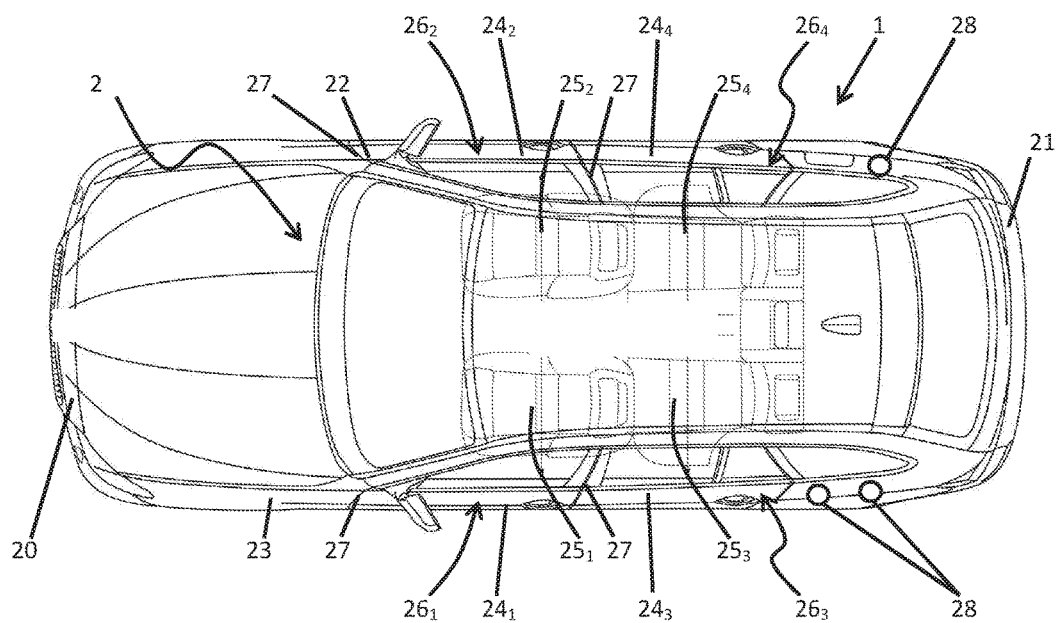
FIG. 1 is a perspective view of a vehicle with an open door in accordance with embodiments.

As shown in FIG. 1, the car 2 has a front end 20, a rear end 21, sides 22 and 23 extending between the front end 20 and the rear end 21, doors $24_{1-4}$ and seats $25_{1-4}$. At each side, the frame of the car 2 is formed to define apertures or openings $26_{1-4}$ that the doors $24_{1-4}$ are respectively associated with. That is, door $24_1$ is associated with opening $26_1$ and, since opening $26_1$ provides for direct access to the driver's seat $25_1$, door $24_1$ may be referred to as the driver's side door $24_1$. Similarly, door $24_2$ is associated with opening $26_2$ and, since opening $26_2$ provides for direct access to the front passenger's seat $25_2$, door $24_2$ may be referred to as the front passenger's side door $24_2$, door $24_3$ is associated with opening $26_3$ and, since opening $26_3$ provides for direct access to the rear, left passenger's seat $25_3$, door $24_3$ may be referred to as the rear, left passenger's side door $24_3$ and door $24_4$ is associated with opening $26_4$ and, since opening $26_4$ provides for direct access to the rear, right passenger's seat $25_4$, door $24_4$ may be referred to as the rear, right passenger's side door $24_4$.

As described herein, the doors $24_{1-4}$ will be described as being hinge-coupled or hinge-connected to the frame of the car 2. It is to be understood, however, that this is merely exemplary and that the doors $24_{1-4}$ could be coupled or connected to the frame of the car 2 in other ways (e.g., by mechanical linkages that allow car doors to open outwardly from the frame of the car, by rails or by linear linkages as in mini-vans, by couplings that allow the doors to rotate upwardly as in certain sports cars or by complicated linkages and couplings that allow the doors to open up vertically as in falcon-wing doors). Accordingly, while the doors $24_{1-4}$ may be pivoted or otherwise moved between open and closed positions, the following description will generally relate only to non-limiting cases in which the doors $24_{1-4}$ are pivoted between the open and closed positions.

The driver's side door $24_1$ is coupled to the frame of the car 2 by a hinge element 27 such that the driver's side door $24_1$ is able to assume a first or closed position at which the opening $26_1$ is closed and such that the driver's side door $24_1$ is able to move or pivot about an axis of the hinge element 27 to thus assume any of multiple second or opened positions at which the opening $26_1$ is open. Similarly, the front passenger's side door $24_2$ is coupled to the frame of the car 2 by a hinge element 27 such that the front passenger's side door $24_2$ is able to assume a first or closed position at which the opening $26_2$ is closed and such that the front passenger's side door $24_2$ is able to move or pivot about an axis of the hinge element 27 to thus assume any of multiple second or opened positions at which the opening $26_2$ is open. Likewise, the rear, left and right passenger's side doors $24_3$, $24_4$ are coupled to the frame of the car 2 by respective hinge elements 27 such that the rear, left and right passenger's side doors $24_3$, $24_4$ are able to assume first or closed positions at which the openings $26_3$, 4 are closed and such that the rear, left and right passenger's side doors $24_3$, $24_4$ are able to move or pivot about respective axes of the hinge elements 27 to thus assume any of multiple second or opened positions at which the openings $26_3$, 4 are open.

Details of the embodiments and illustrations of FIGS. 2 and 3 will now be described with particular relevance to the driver's side door $24_1$ for purposes of clarity and brevity. It is to be understood that the descriptions are similarly applicable to the other doors of the car 2.

Figure 2:
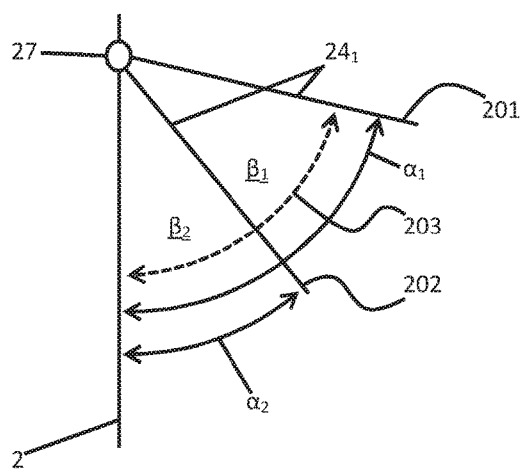
FIG. 2 is a schematic plan view of door positions of the vehicle of FIG. 1.

As shown in FIG. 2, for the driver's side door $24_k$, the hinge element 27 may be formed to define certain opened positions while still permitting an array of undefined opened positions. That is, the multiple second or opened positions may include a controlled, fully opened position 201 that is defined by the driver's side door $24_1$ being maximally moved or pivoted about the axis of the hinge element 27, a controlled, partially opened position 202 that is defined by the driver's side door $24_1$ being partially (e.g., half) moved or pivoted about the axis of the hinge element 27 and uncontrolled, partially opened positions 203 defined by the driver's side door $24_1$ being moved or pivoted about the axis of the hinge element 27 to any point other than the controlled, fully opened position 201 or the controlled, partially opened position 202.

In the controlled, fully opened position 201, the driver's side door $24_1$ is held relatively securely in place by cams or other similar structures of the hinge element 27 so that the driver's side door $24_1$ can be selectively pivoted or moved but will otherwise stay in place (barring high wind conditions or effects of uneven terrain). Similarly, in the controlled, partially opened position 202, the driver's side door $24_1$ is held relatively securely in place by the cams or the other similar structures of the hinge element 27 so that the driver's side door $24_1$ can be selectively pivoted or moved but will otherwise stay in place (again barring high wind conditions or effects of uneven terrain). By contrast, in the uncontrolled, partially opened positions 203, the driver's side door $24_1$ is not held in place by any cams or similar structures of the hinge element 27.

Since the controlled, fully opened position 201 is effectively defined by the hinge element 27, the range of motion or the pivoting range $\alpha_1$ of the driver's side door $24_1$ for the controlled, fully opened position 201 is known and defined. Coincidentally, the area $\beta_1$ that is covered by the driver's side door $24_1$ during a moving or pivoting action from the closed position to the controlled, fully opened position 201 is also known and defined. By the same token, since the controlled, partially opened position 202 is effectively defined by the hinge element 27, the range of motion or the pivoting range $\alpha_2$ of the driver's side door $24_1$ for the controlled, partially opened position 202 is known and defined and the area $\beta_2$ that is covered by the driver's side door $24_1$ during a moving or pivoting action from the closed position to the controlled, partially opened position 202 is also known and defined.

Figure 3:
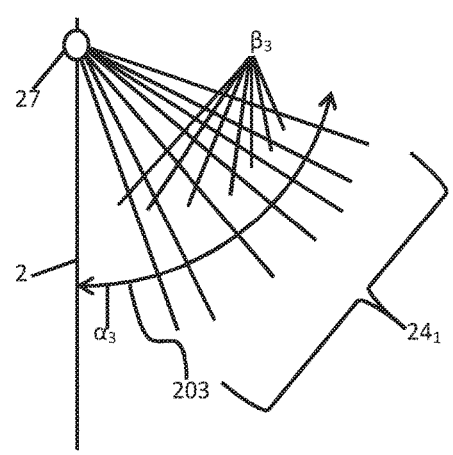
FIG. 3 is a schematic plan view of various required door positions of the vehicle of FIG. 1.

By contrast, as shown in FIG. 3, since the uncontrolled, partially opened positions 203 are undefined by the hinge element 27, the ranges of motion or the pivoting ranges $\alpha_3$ and the areas $\beta_3$ of the driver's side door $24_1$ for the uncontrolled, partially opened positions 203 are unknown and undefined. Nevertheless, the ranges of motion or the pivoting ranges $\alpha_3$ and the areas $\beta_3$ of the driver's side door $24_1$ for the uncontrolled, partially opened positions 203 can be calculated in terms of a needed amount of space to permit a given person or thing to enter or exit the car 2. That is, if the driver of the car 2 aims to get out of the car 2 from the driver's seat $25_k$, a first minimum range of motion or pivoting range of the driver's side door $24_1$ that will allow the driver to comfortably get out of the car 2 can be calculated based on a size and weight of the driver. Such size and weight can be input manually by the driver or estimated based on the driver's commands for positioning the driver's seat $25_1$ and the steering wheel. The size and weight can also be estimated through the historical pattern moving or pivoting range of, for example, the driver's side door $24_1$. That is, if the driver of the car 2 has been using a range of motion or a pivoting range of 20 degrees, this could be the most likely range of motion or pivoting range that the driver of the car 2 will use in the future. In addition, if the driver of the car 2 aims to get out of the car 2 from the driver's seat $25_1$ and to take out a car seat from the rear, left passenger's seat $25_3$, a second minimum range of motion or pivoting range of the rear, left passenger's side door $24_3$ that will allow the driver to comfortably remove the car seat from the car 2 can be calculated based on respective sizes and weights of the driver and the car seat. Again, such sizes and weights can be input manually by the driver or estimated.

As shown in FIG. 1, the car 2 also includes a sensor 28 or an array of sensors 28 at one or more various positions about the frame of the car 2. The sensors 28 can be provided in any form or configuration and may be provided as one or both of optical or sonar based sensors or as any other suitable sensor type. In any case, the sensors 28 are disposed on and around the frame of the car 2 to sense obstructions (see, e.g., the walls 501 and the other car 502 of FIG. 5) surrounding the car 2. In a general sense, the obstructions may include any objects around or proximate to the car 2 and, in a more particular sense, the obstructions may include those objects around or proximate to the car 2 that would present a risk of damage to the car 2 upon contact between a component of the car 2 and the object.

As an example, the component of the car 2 could be any one of the driver's side door $24_1$, the front passenger's side door $24_2$, the rear, left passenger's side door $24_3$ and the rear, right passenger's side door $24_4$. The object could be the walls 501 and/or the car 502 of FIG. 5 or any other reasonably immovable or rigid object.

As shown in FIG. 4, the car 2 also includes a processing element 29. The processing element 29 may be housed within the frame of the car 2 and is coupled to the sensor(s) 28. The processing element 29 may include for example a processing circuit 290, a memory 291, a servo control unit 292 and a networking unit 293. In accordance with embodiments, the memory 291 may include various types of storage and has executable instructions stored thereon. When executed, the executable instructions cause the processing circuit 290 to operate as described herein and to control various operations of the servo control unit 292 and the networking unit 293.

In particular, the executable instructions may be configured to cause the processing circuit 290 to determine whether any of the obstructions are within any of the pivoting ranges $\alpha_1$ or $\alpha_2$, the first minimum range of motion or pivoting range or the second minimum range of motion or pivoting range of any of the doors $24_{1-4}$ of the car 2 by accessing the known ranges of motion or pivoting ranges $\alpha_1$ or $\alpha_2$ and then comparing data generated by the sensor(s) 28 regarding positions of the obstructions relative to the car 2 with the known ranges of motion or pivoting ranges $\alpha_1$ or $\alpha_2$ or by calculating the first or the second minimum range of motion or pivoting range and then comparing the data generated by the sensor(s) 28 with results of those calculations.

Thus, with reference to FIG. 5, the sensors 28 sense the walls 501 and the other car 502 as the car 2 pulls into the parking space 504 and then generate data reflective of the space provided between the car 2 and the walls 501 and the other car 502. In accordance with embodiments, once the car 2 is parked, the processing circuit 290 will determine whether either of the walls 501 or the other car 502 is too close to the car 2 to permit the driver or front passenger to exit the car 2 or to permit a rear passenger (for example, a small child or a small child with a removable car seat) to be removed from the car 2 by the driver.

Figure 6:
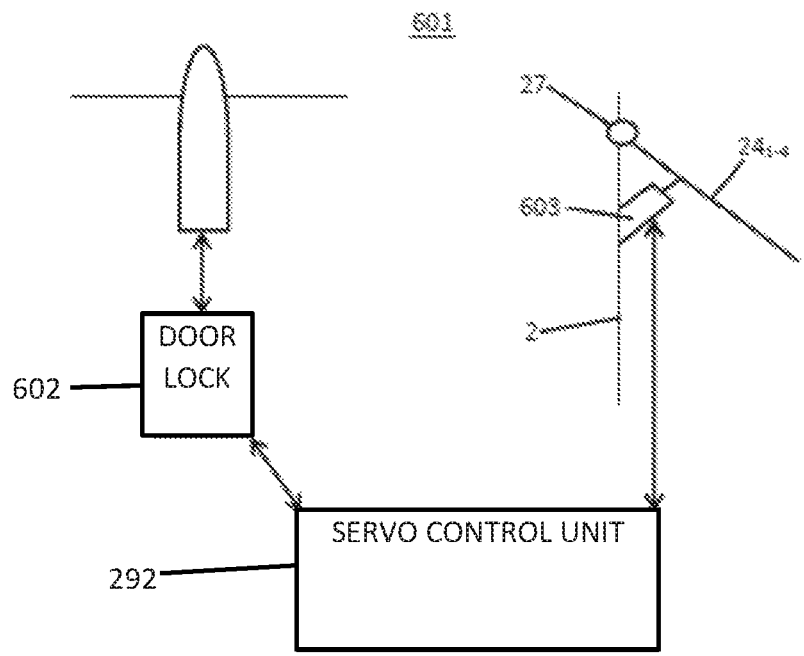
FIG. 6 is a schematic illustration of a door movement limiting system in accordance with embodiments.

With continued reference to FIG. 5 and with additional reference to FIG. 6 and, in accordance with further embodiments, the car 2 may include a door movement or pivot limiting system 601 that can be coupled to the hinge elements 27 or operated as a stand-alone system. In any case, the door movement or pivot limiting system 601 may be configured to limit the range of motion or pivoting range of one or more of the doors $24_{1-4}$ of the car 2 in order to avoid contact between the one or more of the doors $24_{1-4}$ and the obstructions. As shown in FIG. 6, the door movement or pivot limiting system 601 may be provided as a door lock 602 or a linear motor 603. The door lock 602 could be coupled to the servo control unit 292 and would prevent the one or more of the doors $24_{1-4}$ from being opened in case the processing circuit 290 has determined that either of the walls 501 or the other car 502 is excessively close to the car 2. The linear motor 603 could also be coupled to the servo control unit 292 and would be engaged to prevent the one or more of the doors $24_{1-4}$ from being opened so far that they impact the obstructions in case the processing circuit 290 has determined that either of the walls 501 or the other car 502 is close to the car 2 but still far enough to allow for some door openings.

Figure 7:
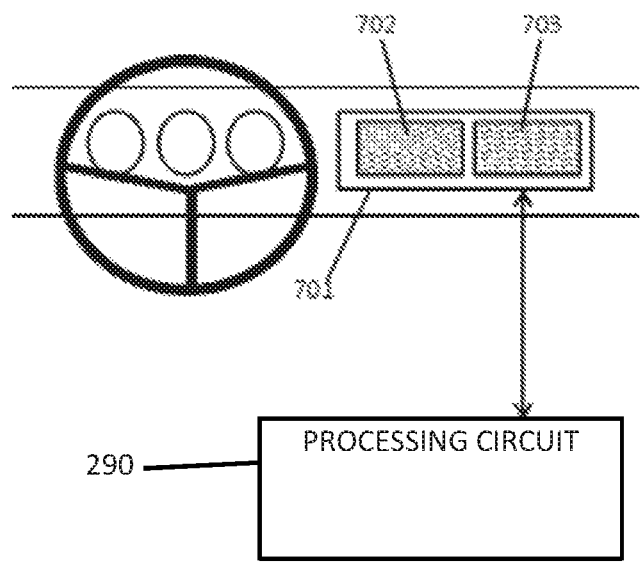
FIG. 7 is a graphical depiction of a proximity warning in accordance with embodiments.

With reference to FIG. 7, the car 2 may also include a warning system 701. The warning system 701 could be coupled to the processing circuit 290 or provided as a component of the processing element 29 as a whole. In any case, the warning system 701 may be configured to issue a proximity warning 702 to an operator or driver of the car 2 in an event of the obstructions being within the determined or calculated ranges of motion or pivoting ranges. In accordance with embodiments, the warning system 701 may only be activated during a parking event or during a "stop-and-open" event when the car 2 is stopped and one or more of the doors $24_{1-4}$ is opened or about to be opened (i.e., when the door latch is being pulled) but the car 2 is not necessarily in park. As shown in FIG. 7, the proximity warning 702 may be provided as a graphically displayed warning on the dashboard or central console of the car 2 and/or as an audible noise or phrase. In accordance with further embodiments, the warning system 701 may be further configured to issue an instruction 703 to the operator or driver of the car 2 to, for example, move the car 2 into a more spacious location or take another similar action.

With reference back to FIG. 5, the sensor(s) 28 may be further configured to determine whether the obstruction is the other car 502 and to additionally sense various identifying features thereof. In these cases, the processing circuit 290 may be further configured by the executable instructions to determine the make and model of the other car 502, to obtain data relating to ranges of motion or pivoting ranges of the doors 503 of the other car 502 and to then determine whether any part of the car 2 is within a range of motion or pivoting range of any of the doors 503 of the other car 502. In another example, the processing circuit 290 may be further configured to obtain data relating to typical ranges of motion or pivoting ranges of the doors 503 the current driver of the other car 502 uses. Thus, the processing circuit 290 can determine whether the doors $24_{1-4}$ pose a danger of impacts to any of the obstructions and whether any of the doors 503 pose a similar but opposite danger of impacts to any part of the car 2.

In accordance with embodiments, the data relating to the ranges of motion or pivoting ranges of the doors 503 may be obtained by the processing circuit 290 from the memory 291 directly or from remote sources by way of the networking unit 293. In the latter case, the remote sources may be the other car 502 especially if the systems described herein are installed in the other car 502 or from a remote server 505. In either case, the data may include the ranges of motion or pivoting ranges of the controlled and fully or partially opened positions of the doors 503 as well as any uncontrolled or minimum ranges of motion or pivoting ranges calculated by a processing circuit of the other car 502. In the case of the data including the uncontrolled or minimum ranges of motion or pivoting ranges calculated by the processing circuit of the other car 502, the data may be communicated to the networking unit 293 from the other car 502 directly or indirectly by way of the remote server 505.

Figure 8:
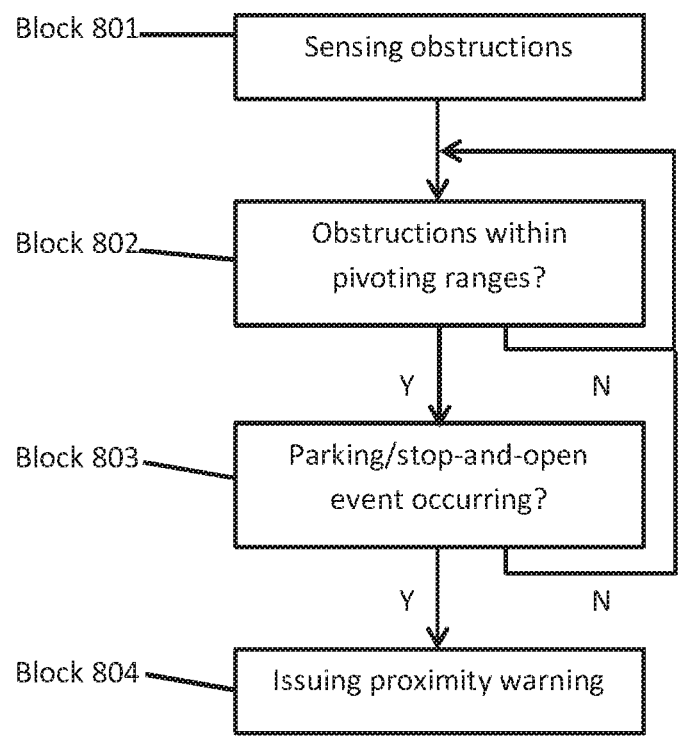
FIG. 8 is a flow diagram illustrating a method of operating a smart opening system in accordance with embodiments.

With reference to FIG. 8, a method of operating a smart opening system is provided. As shown in FIG. 8, the method includes sensing obstructions surrounding the car 2 at block 801, determining whether the obstructions are within the ranges of motion or pivoting ranges of the doors $24_{1-4}$ of the car 2 at block 802, determining whether a parking or a stop-and-open event is currently in effect for the car 2 at block 803 and issuing the proximity warning 702 to the operator or driver of the car 2 in an event that the obstructions are determined to be within the ranges of motion or pivoting ranges of the doors $24_{1-4}$ and the parking or the stop-and-open event is determined to be currently in effect at block 804. Thus, in an event that either of the obstructions are not within the ranges of motion or pivoting ranges of the doors $24_{1-4}$ or the parking or the stop-and-open event is not currently in effect, no such proximity warning 702 will be issued. In this way, in particular, false positives leading to the proximity warning 702 being issued to the driver while the driver is still maneuvering the car 2 can be avoided.

In accordance with further embodiments and, with reference to FIG. 9, a smart opening system 901 is provided for use with multiple cars in which it can be installed. Here, the smart opening system 901 may include a first car 902, doors and sensor(s) where the sensor(s) described above are disposed to sense obstructions 905 and a second car 906 surrounding the first car 902 and a processing element 907. The processing element 907 can be housed in either or both of the first car 902 and the second car 906 and is coupled to the sensor(s). The processing element 907 may be configured to determine whether any of the obstructions 905 or the second car 906 is within a range of motion or pivoting range of any of the doors and whether any part of the first car 902 is within a range of motion or pivoting range of a door of the second car 906.

The processing element 907 may determine whether any part of the first car 902 is within the range of motion or pivoting range of the door of the second car 906 by accessing locally or remotely stored vehicle data related to the second car 906 or by communicating with a processing element of the second car 906 or with a remote server 908.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A smart opening system, comprising:
a vehicle defining an aperture;
a door coupled to the vehicle to assume a first position at which the aperture is closed and multiple second positions at which the aperture is open and to move between the first and second positions;
a sensor disposed to sense obstructions surrounding the vehicle;
a processing element coupled to the sensor and configured to determine whether any of the obstructions are within a range of motion of the door; and
a door movement limiting system comprising a linear motor coupled at opposite ends thereof to a side of the vehicle and an interior side of the door and configured to limit the range of motion of the door to avoid the obstructions.

2. The smart opening system according to claim 1, wherein the vehicle comprises a car and the obstructions comprise objects that present a risk of damage to the car upon car-obstruction contact.

3. The smart opening system according to claim 2, wherein the objects comprise at least one of walls and other vehicles.

4. The smart opening system according to claim 1, wherein the multiple second positions comprise a controlled, fully opened position.

5. The smart opening system according to claim 1, wherein the multiple second positions comprise a controlled, partially opened position.

6. The smart opening system according to claim 1, wherein the multiple second positions comprise an uncontrolled, partially opened position.

7. The smart opening system according to claim 6, wherein the processing element is configured to calculate the range of motion to the uncontrolled, partially opened position in accordance with a size of one or more persons being removed from the vehicle.

8. The smart opening system according to claim 6, wherein the processing element is configured to calculate the range of motion to the uncontrolled, partially opened position in accordance with a combined size of a first person and a second person removing the first person from the vehicle.

9. The smart opening system according to claim 1, further comprising a warning system configured to issue a proximity warning to an operator of the vehicle in an event of obstructions being within the range of motion.

10. The smart opening system according to claim 9, wherein the warning system is activated during a parking or stop-and-open event.

11. The smart opening system according to claim 9, wherein the warning system is further configured to issue an instruction to the operator to move the vehicle into a more spacious location.

12. The smart opening system according to claim 1, wherein the sensor is further configured to determine whether an obstruction is a second vehicle and the processing element is further configured to determine whether any part of the vehicle is within a range of motion of a door of the second vehicle.

13. A method of operating a smart opening system, the method comprising:
sensing obstructions surrounding a vehicle;
determining whether obstructions are within a range of motion of a door of the vehicle;
determining whether a parking or a stop-and-open event is currently in effect for the vehicle;
engaging a linear motor of a door movement limiting system, which is coupled at opposite ends thereof to a side of the vehicle and an interior side of the door, to limit the range of motion of the door to avoid the obstructions; and
issuing a proximity warning to an operator of the vehicle in an event that obstructions are within the range of motion of the door of the vehicle and the parking or the stop-and-open event is currently in effect.

14. A smart opening system, comprising:

a first vehicle defining an aperture;

a door coupled to the first vehicle via a hinge to assume a first position at which the aperture is closed and multiple second positions at which the aperture is open and to move between the first and second positions by pivoting about the hinge;

a sensor disposed to sense obstructions and a second vehicle surrounding the first vehicle;

a processing element coupled to the sensor and configured to determine whether any of the obstructions or the second vehicle is within a range of motion of the door and whether any part of the first vehicle is within a range of motion of a door of the second vehicle, the processing element comprising a servo control unit; and a door movement limiting system comprising a linear motor proximate to the hinge, the linear motor being coupled at opposite ends thereof to a side of the vehicle and an interior side of the door and being configured to be engaged by the servo control unit to limit the range of motion of the door to avoid the obstructions or the second vehicle.

15. The smart opening system according to claim 14, wherein the processing element accesses vehicle data related to the second vehicle to determine whether any part of the first vehicle is within the range of motion of the door of the second vehicle.

16. The smart opening system according to claim 15, wherein the vehicle data is stored locally.

17. The smart opening system according to claim 15, wherein the vehicle data is stored remotely.

18. The smart opening system according to claim 14, wherein the processing element communicates with a processing element of the second vehicle to determine whether any part of the first vehicle is within the range of motion of the door of the second vehicle.

19. The smart opening system according to claim 14, wherein the processing element communicates with a remote server to determine whether any part of the first vehicle is within the range of motion of the door of the second vehicle.

* * * * *